US011865376B2

(12) United States Patent
Ottah

(10) Patent No.: US 11,865,376 B2
(45) Date of Patent: Jan. 9, 2024

(54) FACIAL MASK

(71) Applicant: Chikezie Ottah, Dallas, GA (US)

(72) Inventor: Chikezie Ottah, Dallas, GA (US)

(73) Assignee: Chikezie Ottah, Dallas, GA (US)

( * ) Notice: Subject to any disclaimer, the term of this patent is extended or adjusted under 35 U.S.C. 154(b) by 0 days.

(21) Appl. No.: 17/300,214

(22) Filed: Apr. 15, 2021

(65) Prior Publication Data

US 2022/0331625 A1 Oct. 20, 2022

(51) Int. Cl.
*A62B 25/00* (2006.01)
*A41D 13/11* (2006.01)

(52) U.S. Cl.
CPC .......... *A62B 25/00* (2013.01); *A41D 13/1161* (2013.01)

(58) Field of Classification Search
CPC .. A41D 13/1192; A41D 13/1161; A62B 25/00
See application file for complete search history.

(56) References Cited

U.S. PATENT DOCUMENTS

| | | | | |
|---|---|---|---|---|
| 3,500,825 | A | 3/1970 | Anderson et al. | |
| 4,296,726 | A | 10/1981 | Ross et al. | |
| 4,315,335 | A | 2/1982 | Kennedy, Jr. et al. | |
| 4,832,017 | A | 5/1989 | Schnoor | |
| 7,836,887 | B1 * | 11/2010 | Kling | A62B 23/025 128/206.16 |
| 2017/0238641 | A1 * | 8/2017 | Chapman | A42B 7/00 |
| 2021/0121370 | A1 * | 4/2021 | Lehman | H04M 1/72412 |
| 2021/0337800 | A1 * | 11/2021 | Shaffer | A41D 13/1192 |
| 2021/0386134 | A1 * | 12/2021 | Plank | A41D 31/185 |
| 2022/0039497 | A1 * | 2/2022 | Magdlen | A41D 13/1161 |
| 2022/0143434 | A1 * | 5/2022 | Roesser | A62B 18/084 |

* cited by examiner

*Primary Examiner* — Steven O Douglas

(57) ABSTRACT

A mask protecting the user and attached or sown to utility and or wear onto the body to prevent general contamination of the user, especially dust, flu, biological, or chemical, control or terminate person to person contamination, stop continue body or utility recontamination and spreading of dust, biological or chemical agents into the body, or utility. The new mask may include a medical or anti bacteria disinfectants, maybe powder, liquid, capsule or other types to control and kill germs, further the new mask have a holder, with plurality of holes, and connectors and or inter-connector holding the masks to the body or utilities, like professional garment or uniforms, neck tires, T shirt, shirts, seat, car seat, bed, ear, chin, head, hand, while covering the users, faces, or half faces, particularly, the nose, eyes and the mouth from harm.

4 Claims, 2 Drawing Sheets

FACIAL MASK

CLAIM PRIORITY

U.S. Application No 63/103,742

CROSS REFERENCE TO RELATED APPLICATION

U.S. Pat. No. 449
Patent Application No. 63/103,742

FIELD OF INVENTION

The invention relate generally to a new facial mask with a holder, more specifically to a new facial masks with strap to be connect, fasten or secured attached to a utility, the new facial mask maybe woven or others materials sown, button, Velcro or clip to medical utilities.

BACKGROUND

A method of providing disposable and non disposable mask to the public that do not require over production of mask and waste bf material capital, a typical high rise or hospital have centers, this centers have confined spaces like computer room, community rooms, community bus, train, conference room, classroom, elevator, this confined spaces was designed before covid 19, while it has serve good purpose and continue to be useful but this confined spaces has failed the safety of today Covid 19 Government regulation, typical space are less than government regulated 6 ft or 3 ft distances, matter worst people have bad habit of forgetting their mask before entering confined spaces like the elevators, buses, trains and groceries stores, as noted by government warning this confine spaces breed Covid 19, typically of an unintentional user of an elevator they remember their mask as the elevator door open up, inside the confined space troubling elevator infection may occurs. So there is need for a new mask. Unlike the prior art U.S. Ser. No. 8/612,527, U.S. patent Ser. No. 12/306,668, or 2006-05-2018 It 000012A, ITPS 200GA000012, U.S. Pat. No. 3,500,825A, U.S. 61/185,604, U.S. Ser. No. 11/663,100, U.S. Pat. Nos. 41,100,602, 4,315,335A, GR 900100242A, U.S. Pat. No. 4,296,746A, there mask (PPE) are prone to sleep, wet sleep, no resistance to rain, this products fall to the floor or ground thereby contaminated, causing need for over production of mask, deforestation of the earth and climate change, while there intention was to save life, but OBY is a better mask for the climate, secured to the user with it attached holder to utility and solve all the problems of confined spaces with the fasten strap to body and utility.

SUMMARY OF INVENTION

1. It is the objective of the present invention to produce a mask that will have a holder or strap
2. it is the objective of the present invention to produce a mask that have half face or full face cover
3. it is the objective of the present invention to manufacture a mask that have connector and or interconnector
4. it is an objective of the present invention to manufacture a mask that is design and sown
5. it is the objective of the present invention to manufacture a mask that are designed to fasten or attached to utility
6. it is the objective of the present invention to produce a mask that a designed to be securely fasten to a utility 7. it is the objective of the present invention to manufacture a mask that have holder or strap that is securely attached, fasten, designed with utility
8. it is the objective of the present invention to manufacture masks with a property or industrially recommended materials

BRIEF DESCRIPTION

DETAILED DESCRIPTION

The instant disclosure seeks to provide a protective face mask ("face mask") configured to be fastened or attached (i.e., demountably affixed) to a garment or article of clothing and thereby allow users to retain possession of the face mask when not in use. The face mask is configured to protect the respiratory tract against particles suspended in the air (e.g., dust, solids, and liquid aerosols). In other words, the face mask functions as a barrier that is positioned between the user's respiratory tract and the external environment that can filter out particles suspended in the air.

Figure 1:
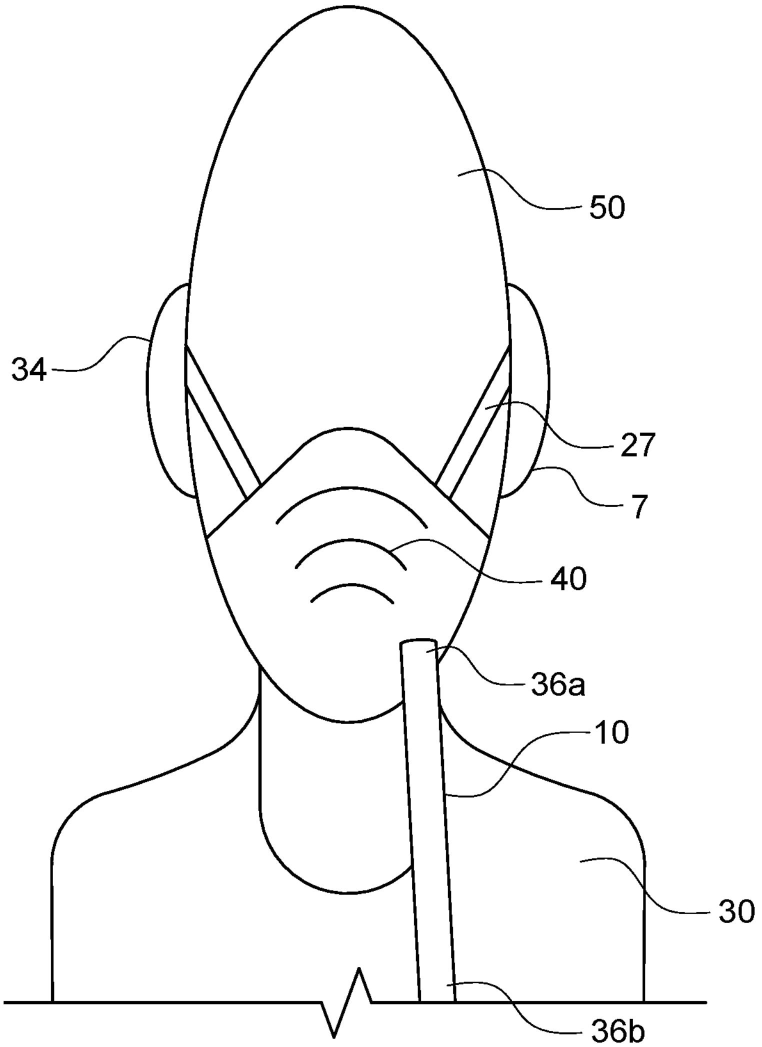
FIG. 1, Is an explosive view of the person wearing the mask, the invention is secured to the utility by a strap.

FIG. 1 depicts a front view of a user, generally 50, wearing a face mask, generally 27, according to some embodiments. The face mask 27 at least includes a strap 10, a main portion 12, loops 7, and a connector. The main portion 12 includes filter material configured to filter out particles suspended in the air (e.g., dust, solids, and liquid aerosols). The main portion 12 can include one or more of woven materials, unwoven materials, transparent materials, polymeric materials, and elastomeric material. The main portion 12 is configured to be positioned adjacent to at least the user's 50 nose (e.g., a nose region) and mouth (e.g., a mouth region) in a manner to protect the user's 50 respiratory tract. The loops 7 extend form the main portion 12. The loops 7 are configured to be worn around the user's 50 ears 34. The loops 7 can include one or more of woven materials, unwoven materials, transparent materials, polymeric materials, and elastomeric material.

The strap 10 is affixed to and extends from the main portion 12. For example, the strap 10 is affixed to and extend from an outer peripheral surface 17 of the main portion 12 at a first end **36*b*. The strap 10 includes a second end 36*a* positioned opposite the first end 36*b*. The connector is coupled to the strap 10 proximate to the second end 36*a*. The connector is configured to be affixed to the garment worn by the user 50 (e.g., a garment 30). The garment 30 can be a shirt, pants, t-shirt, uniform, coveralls, or other type of garment. The connector 36 includes a fastening device that adjustably affixes the strap 10 to the garment 30. The fastening device includes one or more clips, hooks, holes, elastic, or Velcro (i.e., hook-and-loop fasteners). The strap 10 is configured to be demountably affixed to the garment via stitching or a fastener. The face mask 27 can further include an intercom sensor 11 affixed to the main portion 12**.

It should be apparent to those skilled in the art that the patent examples are illustrative and not a limitation, there is other adjustable methods and modifications therein, there may be a departure in other features disclosed, examples, alternative designed, or equivalents or similar claims or pattern, other embodiment, they are intended as part of the scope of this invention.

The 50 user may chose a medicated 77 27 mask or for hygiene, or the user may chose to disinfect the mask 27 after visiting sever of confine spaces, it is cheaper for the user to wash 27 the mask or dis-Infect his or her 27 mask while the 10 mask is solidly 10 hold, 36*a* or fastens 36*b* on the 10 strap.

An 75 alternative design, 77 simply 63 spread the sheet, with a measurement measure the 27 cover or the 27 mask, the 27 designed pattern is comprise, a sheet curve out with a 10 scissor, the shape for 7 ears loop are curved out at any deserve point on the 27 mask, (if head or chin loops are need, with the aid of the scissor cut the designed parts and sow it to fit the user). The 2$^{nd}$ pattern of Oby, the weaver, manufacturer will curved an elongated surplus material, a 10 strap 36*a* connector or 36*b* interconnector, the strap is solidly attach 30 to the utilities of the user choice. The attachment material maybe provide in the 30 utility.

Figure 2:
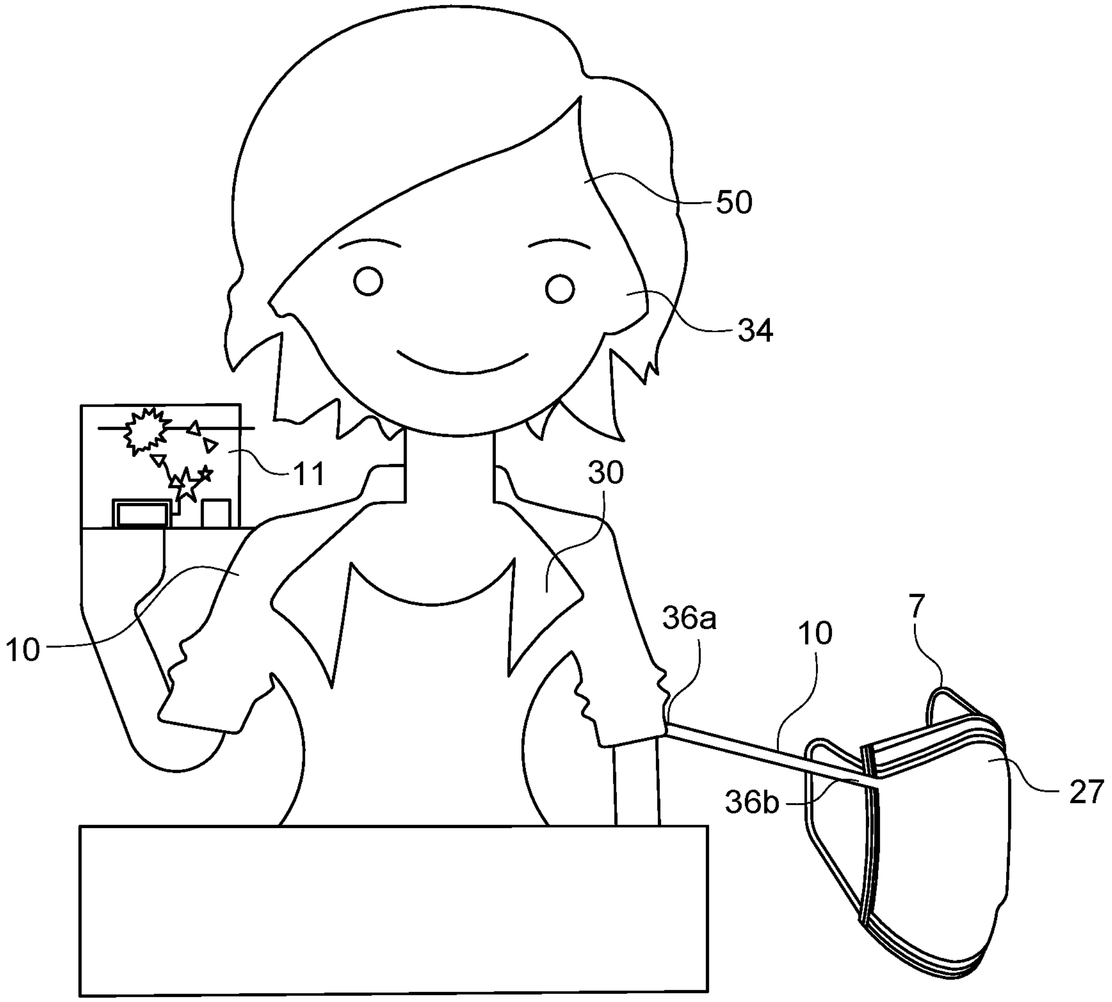
FIG. 2, Is an explosive view of the of the person holding an emergency communicating device to the ear and a mask ready in the other hand.

Attached in FIG. 2, is an 11 electronic (an intercom senor and compatible to network system) system to continuous reminding the 50 residents or visitors to remember to wear or have their 30 mask, it shown hold by a user. The adjustable emergency system is capable of other attachment methods.

It should be apparent to those skilled in the art that the patent examples are illustrative and not a limitation, there is other adjustable methods and modifications therein, there may be a departure in other features disclosed, examples, alternative designed, or equivalents or similar claims or pattern, other embodiment, they are intended as part of the scope of this invention.

I claim:

1. A mask comprising:
a strap;
a main portion;
a plurality of loops;
a connector;
wherein;
the loops extend from the main portion so as to be configured to be worn around a user's ears;
the strap extends from the main portion;
the main portion comprises filter material configured to filter out particles suspended in the air surrounding the mask;
the main portion is configured to at least cover the user's nose and mouth
the connector is coupled to the strap; and
the connector is configured to be affixed to the user's garment via a fastening device.

2. The face mask of claim 1 wherein
the strap extends from an outer peripheral surface of the main portion.

3. The mask of claim 1, wherein
the fastening device comprises a clip at least one of, a hook, a hole, elastic, stitching, or a hook and loop fastener.

4. The mask for of claim 1, wherein
the main portion comprises one or more of a woven material, nonwoven material, a transparent material, a plastic material, and an elastic material.

* * * * *